(12) United States Patent
Caswell et al.

(10) Patent No.: US 11,939,266 B2
(45) Date of Patent: Mar. 26, 2024

(54) CERAMIC DISCS AND RODS, METHODS OF MANUFACTURE THEREOF AND ARTICLES COMPRISING THE SAME

(71) Applicant: Mott Corporation, Farmington, CT (US)

(72) Inventors: Jeffery Caswell, Plainville, CT (US); Piyush Kar, New Britain, CT (US); Alex Hill, South Windsor, CT (US); Alfred M. Romano, Terryville, CT (US); Aravind Mohanram, Avon, CT (US)

(73) Assignee: MOTT CORPORATION, Farmington, CT (US)

( * ) Notice: Subject to any disclaimer, the term of this patent is extended or adjusted under 35 U.S.C. 154(b) by 118 days.

(21) Appl. No.: 17/778,539

(22) PCT Filed: Nov. 24, 2020

(86) PCT No.: PCT/US2020/061964
§ 371 (c)(1),
(2) Date: May 20, 2022

(87) PCT Pub. No.: WO2021/108376
PCT Pub. Date: Jun. 3, 2021

(65) Prior Publication Data
US 2022/0348504 A1 Nov. 3, 2022

Related U.S. Application Data

(60) Provisional application No. 62/941,241, filed on Nov. 27, 2019.

(51) Int. Cl.
C04B 35/10 (2006.01)
C04B 35/101 (2006.01)
(Continued)

(52) U.S. Cl.
CPC ........ *C04B 35/101* (2013.01); *C04B 35/6264* (2013.01); *C04B 38/067* (2013.01);
(Continued)

(58) Field of Classification Search
CPC ....... F15D 1/025; C04B 35/10; C04B 35/101; C04B 35/6264; C04B 38/02; C04B 41/0072
See application file for complete search history.

(56) References Cited

U.S. PATENT DOCUMENTS 4,399,032 A 8/1983 Mott
4,537,429 A 8/1985 Landriault
(Continued)

FOREIGN PATENT DOCUMENTS

CN 1850293 A 10/2006

OTHER PUBLICATIONS

International Search Report for International Application No. PCT/US2020/061964; International Filing Date Nov. 24, 2020; dated Feb. 8, 2021; 3 pages.
(Continued)

*Primary Examiner* — Matthew E. Hoban
(74) *Attorney, Agent, or Firm* — CANTOR COLBURN LLP

(57) ABSTRACT

Disclosed herein is a dual density disc comprising a dense outer tube comprising alumina having a purity of greater than 99%; and a porous core comprising alumina of a lower density than a density of the dense outer tube; wherein the porous core has an alumina purity of greater than 99%. Disclosed herein too is method comprising disposing in a dense outer tube a slurry comprising alumina powder and a pore former; heating the dense outer tube with the slurry disposed therein to a temperature of 300 to 600° C. to activate the pore former; creating a porous core in the dense
(Continued)

Top View

Side View outer tube; and sintering the dense outer tube with the porous core at a temperature of 800 to 2000° C. in one or more stages.

24 Claims, 3 Drawing Sheets

(51) Int. Cl.
    *C04B 35/626*     (2006.01)
    *C04B 38/06*     (2006.01)
    *C04B 41/00*     (2006.01)

(52) U.S. Cl.
    CPC ............... C04B 41/0072 (2013.01); *C04B 2235/3217* (2013.01); *C04B 2235/608* (2013.01); *C04B 2235/658* (2013.01); *C04B 2235/94* (2013.01); *C04B 2237/343* (2013.01); *C04B 2237/525* (2013.01); *C04B 2237/765* (2013.01); *C04B 2237/84* (2013.01)

(56) References Cited

U.S. PATENT DOCUMENTS

| | | |
|---|---|---|
| 4,610,467 A | 9/1986 | Reimert |
| 5,110,470 A * | 5/1992 | Yokosawa .............. C04B 35/457 210/500.25 |
| 7,112,234 B2 | 9/2006 | Jha et al. |
| 7,554,898 B2 | 6/2009 | Blankenbeckler et al. |
| 8,795,417 B2 | 8/2014 | Christie et al. |
| 9,308,584 B2 | 4/2016 | Burgess et al. |
| 2003/0027706 A1* | 2/2003 | Kobayashi .............. C04B 35/10 501/80 |
| 2003/0161254 A1 | 8/2003 | Blankenbeckler et al. |
| 2014/0134036 A1 | 5/2014 | Burgess et al. |
| 2016/0067381 A1 | 3/2016 | Wecker et al. |

OTHER PUBLICATIONS

Written Opinion for International Application No. PCT/US2020/061964; International Filing Date Nov. 24, 2020; dated Feb. 8, 2021; 9 pages.

Hill et al.; U.S. Appl. No. 17/991,066; entitled "Porous Flow Restrictor and Methods of Manufacture Thereof"; filed Nov. 21, 2022.

International Search Report for International Application No. PCT/US2022/050554; International Filing Date Nov. 21, 2022; dated Apr. 12, 2023; 5 pages.

Written Opinion for International Application No. PCT/US2022/050554; International Filing Date Nov. 21, 2022; dated Apr. 12, 2023; 9 pages.

* cited by examiner

CERAMIC DISCS AND RODS, METHODS OF MANUFACTURE THEREOF AND ARTICLES COMPRISING THE SAME

CROSS REFERENCE TO RELATED APPLICATIONS

The present application is a National Stage application of PCT/US2020/061964, filed Nov. 24, 2020, which claims priority benefit to a provisional application which was filed on Nov. 27, 2019, and assigned Ser. No. 62/941,241, both of which are hereby incorporated by reference in their entireties herein.

BACKGROUND

Disclosed herein are ceramic discs and rods, methods of manufacture thereof and articles comprising the same. More specifically, disclosed herein are alumina discs and rods that have a dense shell with a porous core.

SUMMARY

Disclosed herein is a dual density disc comprising a dense outer tube comprising alumina having a purity of greater than 96%; and a porous core comprising alumina of a lower density than a density of the dense outer tube; wherein the porous core has an alumina purity of greater than 99%.

Disclosed herein too is method comprising disposing in a dense outer tube a slurry comprising alumina powder and a pore former; heating the dense outer tube with the slurry disposed therein to a temperature of 300 to 600° C. to activate the pore former; creating a porous core in the dense outer tube; and sintering the dense outer tube with the porous core at a temperature of 800° C. to 2000° C. in one or more stages.

In an embodiment, a method for manufacturing the alumina disc comprises disposing into a dense outer tube an alumina powder. No pore former and/or solvent is used in the powder. The dense outer tube with the alumina powder disposed therein to a temperature of 800 to 2000° C. in one or more steps. This creates a porous core in the dense outer tube that has a purity of greater than 99%. Both the porous core and the dense outer tube have a purity of greater than 99%.

Disclosed herein is a dual density disc comprising a dense outer tube comprising a first ceramic having a purity of greater than 96%; and a porous core comprising a second ceramic of a lower density than a density of the dense outer tube; wherein the porous core has a purity of greater than 99%. In an embodiment, the first ceramic may be the same as the second ceramic. In another embodiment, the first ceramic may be different from the second ceramic.

DETAILED DESCRIPTION

Figures 1A, 1B:
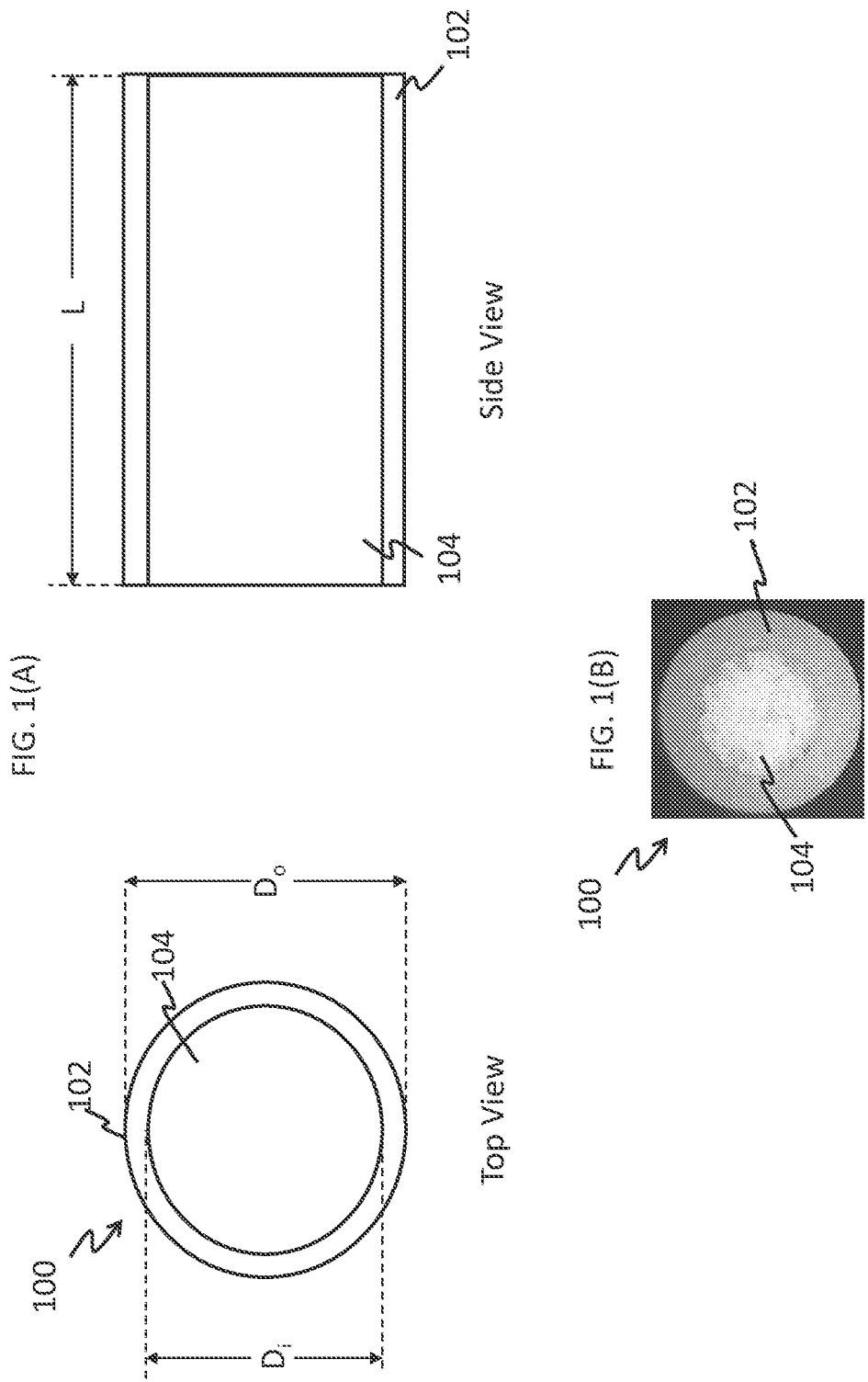
FIG. 1(A) is a schematic depiction of a top view and side view of the dual density alumina disc and rods.
FIG. 1(B) is a cross-sectional view of a dual density alumina disc with a dense shell and a porous core.

Disclosed herein is a ceramic disc or rod (hereinafter termed a "disc") having a dual density that comprises a dense shell and a porous core (of lower density than the shell) that is used for providing uniform gas flow for a variety of applications such as in semiconductor manufacturing operations. The rod may be sliced into a number of smaller slices called discs. The disc has a high strength that is provided by a dense ceramic shell (hereinafter dense shell). The dense shell surrounds the largely porous ceramic core (hereinafter porous core) that permits uniform gas flow during manufacturing operations (such as for making semiconductor wafers). In addition, the disc contains a dense ceramic shell having a high purity of greater than 96% and this prevents contamination of the semiconductor parts during a manufacturing operation that deploys the ceramic disc. The porous core contacts the dense outer tube (the shell) at its inner surface and the outer tube is in continuous contact with the porous core along an entire circumference of the porous core. In an embodiment, the porous core contains the same chemical composition as the dense shell except that the core is porous while the shell is dense. The density of the shell is greater than that of the porous core.

In another embodiment, the porous core contains a ceramic that has a different chemical composition from that of the dense shell. Disclosed herein is a dual density disc comprising a dense outer tube comprising a first ceramic having a purity of greater than 96%; and a porous core comprising a second ceramic of a lower density than a density of the dense outer tube; wherein the porous core has a purity of greater than 99%. In an embodiment, the first ceramic may be the same as the second ceramic. In another embodiment, the first ceramic may be different from the second ceramic.

The ceramic used in the disc comprises an oxide, a carbide, an oxycarbide, a nitride, an oxynitride, a boride, a borocarbide, a boronitride, a silicide, an iodide, a bromide, a sulfide, a selenide, a telluride, a fluoride, or a borosilicide of a metal. Suitable metals are aluminum, titanium, zirconium, silicon, cerium, or the like, or combinations thereof.

In an embodiment, the ceramic is preferably a metal oxide. Preferred metal oxides are titania, silica, alumina, zirconia, ceria, or the like, or a combination thereof. A preferred metal oxide for use in the disc is alumina. While the article and the method of manufacture detailed below are directed to alumina discs, they can equally apply to any of the ceramics listed above. The temperatures and atmosphere listed for manufacturing the alumina disc below work equally well for any of the ceramics listed above and hence there will be no repetition of the annealing temperatures, sintering temperatures or of the atmosphere and pressures used for manufacturing the ceramic disc.

Disclosed herein too are alumina discs or rods (hereinafter termed a "disc") having a dual density that comprises a dense shell and a porous core (of lower density than the shell) that is used for providing uniform gas flow for semiconductor manufacturing operations. The rod may be sliced into a number of smaller slices called discs. The disc has a high strength that is provided by the dense shell. The dense shell surrounds the largely porous core that permits uniform gas flow during manufacturing operations (for making semiconductors). In addition, the disc contains alumina having a high purity of greater than 96% and this prevents contamination of the semiconductor parts during a manufacturing operation that deploys the alumina disc. The porous core contacts the dense outer tube (the shell) at its inner surface and the outer tube is in continuous contact with the porous core along an entire circumference of the porous core. This core-shell dual density structure provides radial hermiticity (i.e. prevent leaks from the sides of the porous body) and allows flow only through longitudinal direction. It is to be noted that the outer shell is referred to herein as the "alumina shell", "alumina tube", the "dense shell" and the "dense outer tube".

Disclosed herein too is a method for manufacturing the alumina disc or rod. The method comprises filling a dense alumina tube with an alumina slurry. The alumina slurry contains alumina powder (of a high purity) and a pore former. The tube with the slurry contained therein is then fired to produce the porous core in the dense alumina tube. The alumina tube with the porous core may then be subjected to finishing operations such as slicing, lapping, grinding, and the like, to produce the alumina disc.

FIG. 1 depicts a ceramic disc 100 that comprises a ceramic shell 102 and a porous ceramic core 104 contained therein.

The ceramic tube (also referred to herein as a ceramic shell) that is used for manufacturing the ceramic disc has an outer diameter ($D_o$) of 1.0 to 75 millimeters, preferably 3.5 millimeters to 12.6 millimeters and an inner diameter ($D_i$) of 0.8 to 70 millimeters, preferably 1.4 to 2.2 millimeters. These diameter dimensions also apply to the ceramic disc that may be obtained by slicing the ceramic tube. The ceramic tube has length (L) of 1 millimeters to 120 millimeters, preferably 3.5 to 25.4 millimeters. The ceramic tube has a purity of greater than 96%, preferably greater than 99% and has a density of greater than 3.0 to 3.95 grams per cubic centimeter ($g/cm^3$). The dimensions shown in the FIG. 1 apply to an alumina tube that comprises the alumina dense shell and the porous alumina core.

The porous core is manufactured by filling the hollow central portion of the alumina tube with an alumina slurry or powder and then heating the tube with the slurry or powder contained therein to form the alumina disc. The slurry comprises alumina powder having a high purity, an optional solvent and a pore former. These are detailed below.

The porous core may also be formed without the use of a pore former and a solvent. The distribution in particle sizes may produce the porous core when sintering is formed. Neighboring portions of the particles undergo necking as they bond with each other to form the porous core.

Alumina powder having either narrow particle size distribution or a wide particle size distribution is formed into a slurry with a solvent and a pore former. The alumina powder can have particles sizes of 10 nanometers to 500 micrometers, preferably 100 nanometers to 150 micrometers, and more preferably 150 nanometers to 100 micrometers. The alumina powder can have a unimodal distribution of particle sizes or alternatively can have a bimodal or greater distribution of particle sizes.

The alumina powder also has a purity of greater than 99% and preferably greater than 99.3%. The alumina powder may be present in the slurry in an amount of 10 to 90 wt %, preferably 20 to 60 wt %, based on the total weight of the slurry.

The solvent is optional. The solvent used for forming the slurry may include polar or non-polar solvents. Solvents may be protic or aprotic. Liquid aprotic polar solvents such as propylene carbonate, ethylene carbonate, butyrolactone, acetonitrile, benzonitrile, nitromethane, nitrobenzene, sulfolane, dimethylformamide, N-methylpyrrolidone, or the like, or combinations thereof are generally desirable. Polar protic solvents such as, but not limited to, water, methanol, acetonitrile, nitromethane, ethanol, propanol, isopropanol, butanol, or the like, or combinations thereof may be used. Other non-polar solvents such a benzene, toluene, carbon tetrachloride, hexane, diethyl ether, tetrahydrofuran, or the like, or combinations thereof may also be used. A suitable solvent is water, alcohol, or a combination thereof.

When present, the solvent may be used in amounts of 5 to 80 wt %, preferably 15 to 60 wt %, based on the total weight of the slurry.

The pore former is optional. A pore former may (or may not) be mixed into the slurry to facilitate the formation of a porous core in the alumina tube. As noted above, the distribution in particle sizes may give rise to the porosity present in the core (when a solvent or a pore former is not used in the slurry). The pore former may be a gas, a liquid or a solid. In an embodiment, the pore former is organic and may decompose to liberate a gas when heated to elevated temperatures. Examples of such pore former include solids such as AIBN (azobisisobutyronitrile), which is an organic compound having formula $[(CH_3)_2C(CN)]_2N_2$. It is a white powder, soluble in alcohols and common organic solvents.

In another embodiment, the pore former may be an organic polymer. The polymer is generally in powdered form and is mixed with the alumina powder to form a mixture (or a slurry, if a solvent is also used) that is then disposed in the alumina tube. Upon heating the alumina tube to temperatures of 300 to 600° C., the polymer decomposes and facilitates the formation of pores in the alumina powder.

Organic polymers used in the spaced features and/or the surface can be may be selected from a wide variety of thermoplastic polymers, blend of thermoplastic polymers, thermosetting polymers, or blends of thermoplastic polymers with thermosetting polymers. The organic polymer may also be a blend of polymers, copolymers, terpolymers, or combinations comprising at least one of the foregoing organic polymers. The organic polymer can also be an oligomer, a homopolymer, a copolymer, a block copolymer, an alternating block copolymer, a random polymer, a random copolymer, a random block copolymer, a graft copolymer, a star block copolymer, a dendrimer, a polyelectrolyte (polymers that have some repeat groups that contain electrolytes), a polyampholyte (a polyelectrolyte having both cationic and anionic repeat groups), an ionomer, or the like, or a combination comprising at last one of the foregoing organic polymers. The organic polymers have number average molecular weights greater than 10,000 grams per mole, preferably greater than 20,000 g/mole and more preferably greater than 50,000 g/mole.

Exemplary organic polymers include polyacetals, polyacrylics, polycarbonates, poly(meth)acrylates, polyalkyds, polystyrenes, polyolefins, polyesters, polyamides, polyaramides, polyamideimides, polyarylates, polyurethanes, epoxies, phenolics, silicones, polyarylsulfones, polyethersulfones, polyphenylene sulfides, polysulfones, polyimides, polyetherimides, polytetrafluoroethylenes, polyetherketones, polyether ether ketones, polyether ketone ketones, polybenzoxazoles, polyoxadiazoles, polybenzothiazinophenothiazines, polybenzothiazoles, polypyrazinoquinoxalines, polypyromellitimides, polyguinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polypropylenes, polyethylenes, polyethylene terephthalates, polyvinylidene fluorides, polysiloxanes, or the like, or a combination thereof.

In another embodiment, the pore former may be a gas that is soluble in the alumina powder or in the solvent used in the slurry. The gas may then phase separate (upon changing the pressure and/or temperature) from the slurry (due to binodal decomposition) to form a porous phase (which are the pores) in the slurry. Examples of such gases include carbon dioxide, argon, hydrogen, nitrogen, or combinations thereof.

In yet another embodiment, a blowing agent such as a chlorofluorocarbons, hydro-chlorofluorocarbons (HCFCs), and/or hydrofluorocarbons (HFCs) may be used to form the pores. Chlorofluorocarbons (CFCs) are derived from methane and ethane and these compounds have the formulae $CCl_mF_{4-m}$ and $C_2Cl_mF_{6-m}$, where m is nonzero. Hydrochlorofluorocarbons (HCFCs) are also derived from methane and ethane these compounds have the formula $CCl_mF_nH_{4-m-n}$ and $C_2Cl_xF_yH_{6-x-y}$, where m, n, x, and y are nonzero. Hydrofluorocarbons (HFCs) may also be derived from methane, ethane, propane, and butane, these complounds have the respective formulae $CF_mH_{4-m}$, $C_2F_mH_{6-m}$, $C_3F_mH_{8-m}$, and $C_4F_mH_{10-m}$, where m is nonzero.

The pore former may also be used in amounts of 5 to 50 wt %, preferably 10 to 50 wt %, based on the total weight of the slurry. Combinations of the foregoing pore formers may be also be used.

The slurry is prepared by mixing the alumina powder, the optional solvent and the pore former. The slurry is then introduced into the hollow center of the alumina tube. The slurry may or may not be compacted.

The alumina tube with the slurry contained therein is subjected to a temperature of 300 and 600° C. for a period of 10 minutes to 12 hours to form the pores in the core of the alumina tube. This step facilitates the activation of the pore former. The elevated temperature causes the pore former to decompose and liberate gases which facilitate the pore formation in the core of the alumina tube.

The alumina tube with the porous alumina contained therein is then subjected to one or more sintering steps. In an embodiment, a first sintering step is performed at temperatures of 800 to 1600° C., in air or in a controlled atmosphere. This first sintering step is optional and is performed to enhance handleability (i.e., ensuring that the porous core remains intact within high density alumina shell). The first sintering step is performed in either, vacuum, air, oxygen, argon, nitrogen, natural gas, hydrogen, carbon dioxide, or a combination thereof in vacuum, atmospheric pressure and/or in a controlled pressure environment where the pressure is greater than atmospheric pressure.

The alumina tube with the porous core is then subjected to a second sintering step performed at temperatures of 1500 and 2000° C. in either, vacuum, air, oxygen, argon, nitrogen, natural gas, hydrogen, carbon dioxide, or a combination thereof to yield an alumina disc with the porous center. The porous center comprises open cell pores which permit a gas to flow through the alumina disc from one end to another.

In an embodiment, a method for manufacturing the alumina disc comprises disposing into a dense outer tube an alumina powder. No pore former and/or solvent is used in the powder. The dense outer tube with the alumina powder disposed therein is sintered to a temperature of 800 to 2000° C. in one or more steps. The two-step sintering process detailed above may also be used here. This creates a porous core in the dense outer tube. The porous core is directly covalently bonded to the dense outer tube. This creates a porous core in the dense outer tube that has a purity of greater than 99%. Both the porous core and the dense outer tube have a porosity of greater than 99%. In other words, there are no adhesives or additives used to facilitate bonding of the porous core to the dense outer tube.

In both of the sintering methods disclosed above, the porous core has a higher purity than the dense outer tube. This applies to all ceramic discs.

The sintered alumina disc is now a dual-density part having a first higher density shell and a second lower density core. The part then may or may not be subjected to further finishing operations. The alumina shell density is greater than that of the porous alumina core. In an embodiment, the finishing operation can involve slicing the disc into several smaller discs. In another embodiment, the alumina disc can have features such as, a radius at an edge, a step or a chamfer (or multiple chamfers) that can be machined into the shell, before formation of porous (within) or after the formation of the pores. The porous portion within the outer alumina shell can be made flush with the shell wall by machining that includes milling. The outer diameter can be ground to meet desired dimensions. Machining can be performed by using a water-soluble coolant to wash out any remnant post-machining impurity to ensure high purity of the parts.

The dual density alumina disc permit fluid to flow from one side to the other and can be used as flow controllers and filters, made to various pore sizes distributions. High crush strength because of dense alumina shell and high flow because of porous (formed without compaction) within the shell is a key characteristic of the dual-density parts. Pore size is greater than 0.5 micrometer and can be controlled for flow control and filtration applications. A strong bond (via covalent bonding and/or ionic bonding) between porous alumina and the alumina tube (shell) is created during the sintering process.

The dual-density alumina discs adhere to cleanliness standards set forth by the semiconductor industry. This is witnessed by the low particulate shedding under exposure to sonication in de-ionized water. Crush strength of dual-density alumina disc can exceed 20,000 pounds per square inch and crush strength of porous portion can exceed 1000 pounds per square inch, preferably 2000 pounds per square inch when tested as detailed below. The crush strength and flow of the gases within the pores depend on the initial particle size distribution of the alumina powder used, the amount (i.e. weight percent) of pore former in the blend and the sintering conditions. Additionally, flow increases with increase in inner diameter and decrease in length of the alumina disc. Flow rate, crush strength (of the porous region within the dense shell) and density data of the dual-density disc obtained using different blend compositions is shown in Table 1 below. The Table 1 contains exemplary data from samples that were tested. The flow rate was determined at a gauge pressure of 30 pounds per square inch.

TABLE 1

| Blend composition (% denote weight percentage) | $N_2$ Flow rate (SCCM), 30 PSI gauge pressure | Density (g/cc) | Crush Strength* of porous within shell (PSI) |
| --- | --- | --- | --- |
| 85% alumina powder, and 15% pore former | 10,000 to 15,000 | 1.2 to 1.5 | 2000 to 6000 |
| 80% alumina powder, and 20% pore former | 15,000 to 20,000 | 1.1 to 1.4 | 2000 to 5000 |

TABLE 1-continued

| Blend composition (% denote weight percentage) | N₂ Flow rate (SCCM), 30 PSI gauge pressure | Density (g/cc) | Crush Strength* of porous within shell (PSI) |
|---|---|---|---|
| 75% alumina powder, and 25% pore former | 15,000 to 22,000 | 1.0 to 1.3 | 2000 to 4000 |

The Table 1 shown the composition of matter of the porous center after sintering. The flow rate through the alumina disc can vary over a broad range depending on the application. It can be seen that the nitrogen flow rate through the alumina disc varies from 5,000 to 30,000 standard cubic centimeters per minute, preferably 10,000 to 22,000 standard cubic centimeters per minute. The bulk density of the porous core varies from 1.00 to 2.50 g/cc, preferably 1.05 to 1.30 g/cc, preferably 1.08 to 1.27 g/cc and the crush strength is 1800 to 2500 pounds per square inch within the alumina disc. FIG. 1(B) depicts a cross-section of an alumina disc with a dense skin and a porous core. In an embodiment, the porous core has a bulk density of 1.00 to 1.30 g/cc and the crush strength is greater than 2000 pounds per square inch when present within the dense outer tube.

The porous core has a porosity greater than 30 volume percent, preferably greater than 50 volume percent, preferably greater than 70 volume percent, preferably greater than 80 volume percent, and more preferably greater than 90 volume percent, based on the total volume of the core. The ceramic disc also displays radial hermiticity, i.e., it does not leak from the sides of the porous body when a fluid is transported through it. It therefore permits flow in only a longitudinal direction (in the length L direction (see FIG. 1(A)).

Figure 2B:
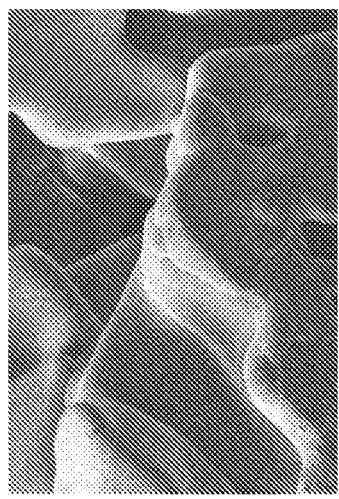
FIG. 2(B) is another micrograph of the porous core taken a higher magnification than the FIG. 2(A)
Figure 2A:
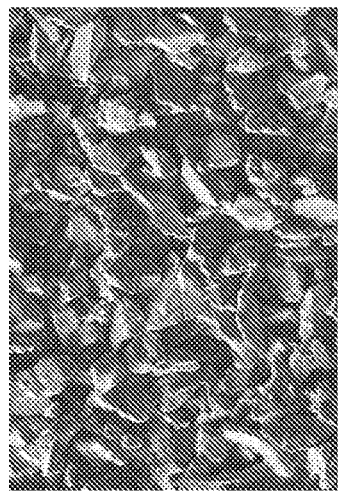
FIG. 2(A) is a micrograph of the porous core taken at lower magnification.

FIGS. 2(A) and 2(B) show the porous region of the alumina disc as viewed in scanning electron microscopy micrographs. FIG. 2(A) show the porous region at a low magnification while FIG. 2(B) shows the porous region at a high magnification.

Figure 3:
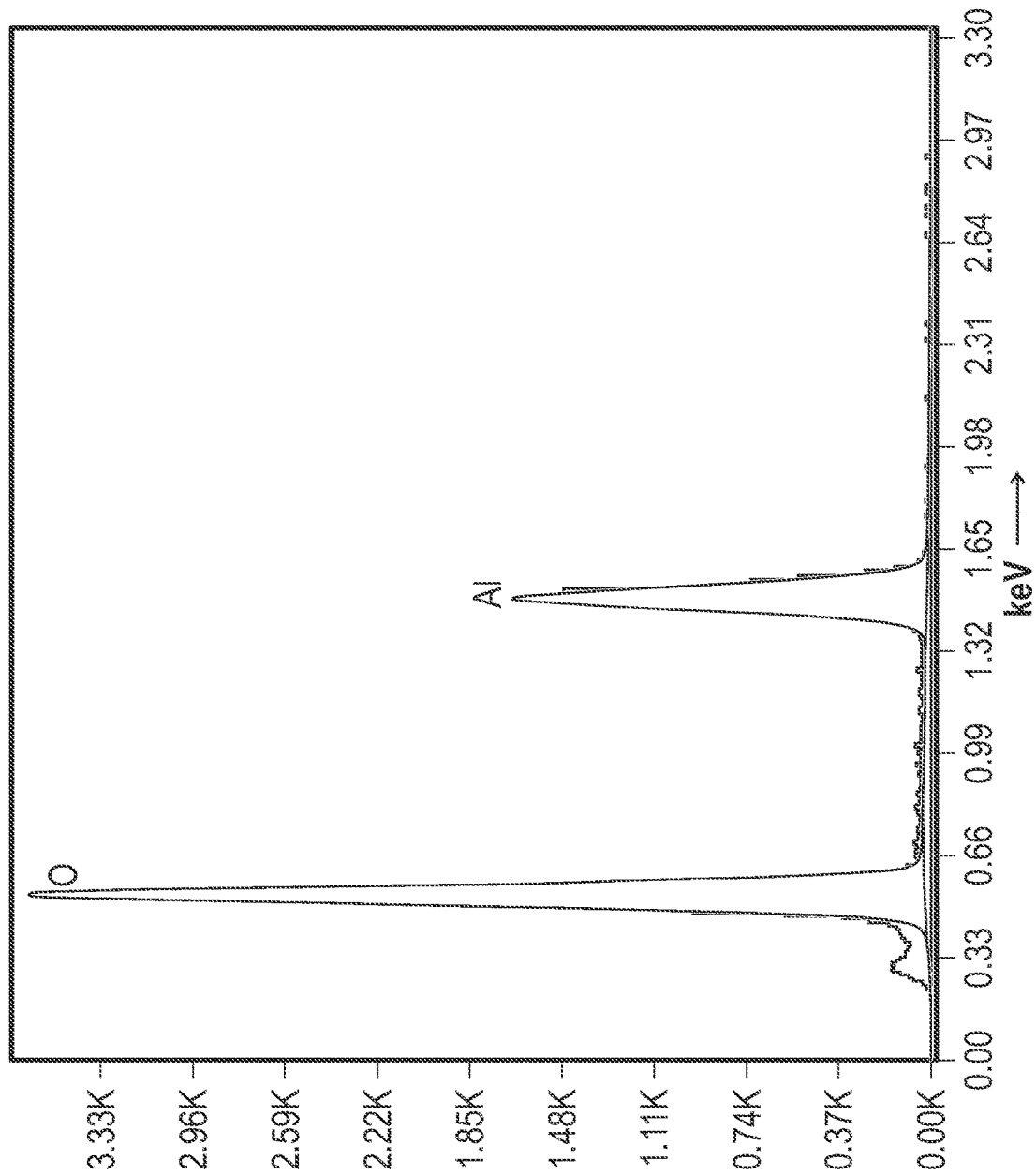
FIG. 3 is a graph from energy dispersive xray analysis that shows that the core contains only aluminum and oxygen in the form of alumina; the alumina is greater than 99.3 percent pure.

Energy dispersive xray analysis (EDAX) performed on the core shows that it is of high purity (>99.3%). This may be seen in the FIG. 3, which shows a graph of the aluminum signal for the alumina disc. FIG. 3 shows EDAX spectra of dual-density parts showing the presence of aluminum and oxygen as the only elements, which demonstrates the high purity of the dual density alumina disc. The porous section has a very great purity and is manufactured by using alumina powder having a purity that is greater than 99.9% and the alumina tube (shell) has a purity of greater than 99.3%. The porous section is directly covalently bonded to the alumina tube (shell).

TEST METHODS

Porous Crush Strength Test

In order to access the crush strength of the porous core, a method was developed to independently apply force solely to the porous core as opposed to applying force on both on the porous core and dense shell. This method involves fixturing the part in an apparatus that allows for a gauge pin, with a diameter equivalent to the diameter of the porous core, to rest perpendicular to the surface of the porous core. The opening on this fixture that accommodates the gauge pin is made to be 0.005 inches wider than the diameter of the gauge pin so as to minimize frictional forces. The part is fixtured in this apparatus such that the shell is pinned to a surface inside the apparatus and cannot be displaced whereas the porous can be displaced given enough load.

To test the crush strength, the part is placed into the apparatus and loaded onto an MTS or an Instron compressive strength testing machine. The fixture is placed onto a flat, fixed bottom plate. The gauge pin is loaded into the top of the fixture. A flat, upper plate is then set to displace downwards at a rate of 0.001 inch/second, applying a load onto the gauge pin, which then applies a load onto the part. Part failure is recorded by the machine and is manually/visually characterized by two failure methods. The first failure method involves the porous pushing out of the shell. The second failure mode involves crushing the porous material. Whatever failure mode happens first, the load at this failure mode is translated into the compressive strength.

Density Determination Test

Shell: The shell's outer diameter and length is dimensioned via use of a drop gauge. The inner diameter is measured via imaging and analysis. Mass is recorded via use of an analytical balance. Density is recorded as the measured mass divided by the calculated volume.

Porous Core: The mass before and after processing the porous is taken. The differential between the measured mass of only the shell and the measured mass of the finished part (with shell and porous core) translates to the mass of the porous core. The dimensions of the porous core are taken. A drop gauge measures the length of the porous core and optical imaging yields the diameter. Density is taken as the differential mass divided by the calculated volume.

Shell+Porous: Finished part is dimensioned by drop gauge. Mass is recorded via analytical balance. Density of the bulk part is calculated as the measured mass over the calculated volume.

While the invention has been described with reference to some embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiments disclosed as the best mode contemplated for carrying out this invention, but that the invention will include all embodiments falling within the scope of the appended claims.

What is claimed is:

1. A dual density disc comprising:
   a dense outer tube comprising alumina having a purity of greater than 96%; and
   a porous core comprising alumina of a lower density than a density of the dense outer tube; wherein the porous core has an alumina purity of greater than 99%.

2. The dual density disc of claim 1, wherein the porous core has a bulk density of 1.00 to 2.5 g/cc and the crush strength is greater than 2000 pounds per square inch when present within the dense outer tube.

3. The dual density disc of claim 1, where the porous core contacts the dense outer tube at its inner surface and where the dense outer tube is in continuous contact with the porous core along an entire circumference of the porous core.

4. The dual density disc of claim 1, wherein a flow rate of nitrogen at a gauge pressure of 30 pounds per square inch in the dual density disc varies from 5,000 to 30,000 standard cubic centimeters per minute.

5. The dual density disc of claim 1, having radial hermiticity, which does not leak from the sides of the porous body and permits flow in only a longitudinal direction.

6. The dual density disc of claim 1, wherein the dense outer tube has an outer diameter of 1 to 75 millimeters and an inner diameter of 0.8 to 70 millimeters.

7. The dual density disc of claim 1, wherein the dense outer tube has an initial length of 1 to 120 millimeters.

8. The dual density disc of claim 1, wherein the porous core is manufactured from alumina powder having an initial purity of greater than 99%.

9. The dual density disc of claim 1, wherein the porous core is manufactured from alumina powder having an initial purity of greater than 99.3%.

10. A method comprising:
disposing in a dense outer tube a slurry comprising:
alumina powder and a pore former;
heating the dense outer tube with the slurry disposed therein to a temperature of 300 to 600° C. to activate the pore former;
creating a porous core in the dense outer tube; and
sintering the dense outer tube with the porous core at a temperature of 800 to 2000° C. in one or more steps.

11. The method of claim 10, where the sintering operation is performed in air, nitrogen, natural gas, argon, hydrogen, or a combination thereof.

12. The method of claim 10, where the pore former is an organic pore former.

13. The method of claim 10, where the slurry further comprises a solvent.

14. The method of claim 10, wherein the sintering is preceded by a first sintering step where the temperature is 1200 to 1600° C.

15. The method of claim 10, where the pore former is azobisisobutyronitrile.

16. The method of claim 10, where the pore former is gas that is soluble in the alumina slurry.

17. The method of claim 10, where the pore former is a liquid.

18. The method of claim 10, wherein the pore former is an organic polymer.

19. The method of claim 18, wherein the organic polymer is a polyacetal, a polyacrylic, a polycarbonate, a poly(meth) acrylate, a polyalkyd, a polystyrene, a polyolefin, a polyester, a polyamide, a polyaramide, a polyamideimide, a polyarylate, a polyurethane, an epoxy, a phenolic, a polyarylsulfone, a polyethersulfone, a polyphenylene sulfide, a polyimide, a polyetherimide, a polytetrafluoroethylene, a polyetherketone, a polyether ether ketone, a polyether ketone, a polybenzoxazole, a polyoxadiazole, a polybenzothiazinophenothiazine, a polybenzothiazole, a polypyrazinoquinoxaline, a polypyromellitimide, a polyguinoxaline, a polybenzimidazole, a polyoxindole, a polyoxoisoindoline, a polydioxoisoindoline, a polytriazine, a polypyridazine, a polypiperazine, a polypyridine, a polypiperidine, a polytriazole, a polypyrazole, a polycarborane, a polyoxabicyclononane, a polydibenzofuran, a polyphthalide, a polyacetal, a polyanhydride, a polyvinyl ether, a polyvinyl thioether, a polyvinyl alcohol, a polyvinyl ketone, a polyvinyl halide, a polyvinyl nitrile, a polyvinyl ester, a polysulfonate, a polysulfide, a polythioester, a polysulfone, a polysulfonamide, a polyurea, a polyphosphazene, a polysilazane, a polyvinylidene fluoride, a polysiloxane, or a combination thereof.

20. A method comprising:
disposing into a dense outer tube an alumina powder; where the aluminum powder does not contain a pore former;
sintering the dense outer tube with the alumina powder disposed therein to a temperature of 800 to 2000° C.; and
creating a porous core in the dense outer tube; where the porous core has a purity of greater than 99%.

21. The method of claim 20, further comprising heating the dense outer tube with the alumina powder disposed therein to a temperature of 1200 to 1600° C.

22. A dual density disc comprising:
a dense outer tube comprising a first ceramic having a purity of greater than 96%; and
a porous core comprising a second ceramic of a lower density than a density of the dense outer tube; wherein the porous core has a purity of greater than 99%.

23. The dual density disc of claim 22, wherein the first ceramic is the same as the second ceramic.

24. The dual density disc of claim 22, wherein the first ceramic is different from the second ceramic.

\* \* \* \* \*